US006485119B1

(12) United States Patent
Davis et al.

(10) Patent No.: US 6,485,119 B1
(45) Date of Patent: Nov. 26, 2002

(54) QUICK REMOVAL ACCENT PANELS ON THE COMPUTER CASE

(75) Inventors: David R. Davis, Jefferson, SD (US); David D. Williams, El Paso, TX (US); Daniel C. Castillo, El Paso, TX (US); Dirk O. Cosner, Sioux City, IA (US); Jorge A. Moriel, El Paso, TX (US); Michael J. Calvillo, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 81 days.

(21) Appl. No.: 09/637,964

(22) Filed: Aug. 11, 2000

(51) Int. Cl.$^7$ ................................................. A47B 95/02
(52) U.S. Cl. .................. 312/244; 312/265.6; 312/223.2
(58) Field of Search .............................. 312/223.2, 244, 312/204, 243.1, 332.1, 265.6

(56) References Cited

U.S. PATENT DOCUMENTS

| | | |
|---|---|---|
| 4,901,261 A | 2/1990 | Fuhs |
| 5,011,198 A | 4/1991 | Gruenberg et al. |
| 5,116,261 A | 5/1992 | Lan et al. |
| 5,323,290 A | 6/1994 | Blair et al. |
| 5,557,499 A | 9/1996 | Reiter et al. |
| 5,721,668 A | 2/1998 | Barrus et al. |
| 5,845,978 A | 12/1998 | Jung et al. |
| 5,870,282 A | 2/1999 | Andre et al. |
| 5,941,617 A | 8/1999 | Crane, Jr. et al. |
| D414,759 S | 10/1999 | Lu |
| D415,139 S | 10/1999 | Fu |
| 6,017,106 A | 1/2000 | Adams et al. |
| 6,018,456 A | 1/2000 | Young et al. |

OTHER PUBLICATIONS

Polaris Blue Color Cover for ThinkPad i Series 1400/1500; http://commerce.www.ibm.com/cgi–bin/nco . . . br=1&entry=840&kabg=en__US; Mar. 31, 2000, 9:24 a.m.
Apriva S Series; http://www.pc.ibm.com/us/aptiva/sseries/index.html; Mar. 31, 2000, 9:27 a.m.
The Power Mac G4 is Living Proof that There's Strength in Numbers; http://www.apple.com/powermac/specs.html; Mar. 31, 2000 9:06 a.m.
Choose a Desktop Line; http://www.dell.com/us/en/dhs/products/line__desktops.htn; Mar. 24, 2000, 4:20 p.m.
Enhance Your WebPC; http://commerce.us.dell.com/dell-store/c. . . __id=19&keycode=6V3X2&order__code=500306w; Mar. 24, 2000, 4:23, p.m.
Enhance Your WebPC; http://commerce.us.dell.com/dell-store/c . . . __id=19&keycode=6V3X2&order__code=500306w; Mar. 24, 2000, 4:23, p.m.

*Primary Examiner*—Lanna Mai
*Assistant Examiner*—Jerry A. Anderson
(74) *Attorney, Agent, or Firm*—Scott Charles Richardson; Chad W Swantz; Suiter & Associates

(57) ABSTRACT

The present invention discloses an accent panel incorporated with an aperture in the panel that allows access to a support member attached to a bezel. A person's hand may fit within the aperture and grasp the support member to allow easy transport of the computer. The panel may be installed and removed easily without the need for tools. A user of a computer equipped with an accent panel of the present invention may be able to match the color of the front of his or her computer to his or her surroundings while still allowing access to a support member to allow easier transport of a computer.

16 Claims, 4 Drawing Sheets

QUICK REMOVAL ACCENT PANELS ON THE COMPUTER CASE

FIELD OF THE INVENTION

The present invention relates generally to computer cases and more specifically to quick removal accent panels on a computer case.

BACKGROUND OF THE INVENTION

As computers and digital information appliances are becoming ever more popular and becoming a fixture in today's typical home and office, a common perception among computer users is that the computer is similar to other appliances and furniture that are utilized to comfort and enhance the standard of living for individuals. For example, the computer is beginning to be thought of as a necessity to many individuals, much like a range, microwave oven, refrigerator, and sofa. Along with this perception and rationale comes a demand among the public that visual accommodations accompany the computer to allow better incorporation with the décor in a home or office. For example, refrigerators and sofas are items that are utilized by many individuals, however, they tend to come in different shapes, sizes, and colors so that the item coordinates and matches the area in which the item is located. A similar rationale is developing with computers as consumers desire their computer to coordinate and match the area in which it is located.

In the past, computers were manufactured and available in limited styles and colors, the colors being generally limited to white, cream, and black. Recently, computer manufacturers have been producing computers in a variety of colors allowing the consumer to choose a color of his or her preference at little or no additional cost. However, upon a change in location, the computer color selected at the time of purchase may not coordinate well with another location. In the home and especially the workplace, a single computer may be utilized in several locations. While a non-typical color, green for example, may coordinate well in one location it may clash with the appearance in another location.

Computers known to the art include towers that enclose the components and systems that makeup the computer. Towers typically are heavy and awkward to move around. Along with being difficult to move, towers typically do not include a handle suitable for easier transport of the tower.

Consequently, it would be advantageous if an apparatus existed that could be used to modify the visual appearance of a computer. Further, it would be advantageous if the device could be easily interchanged to meet the appearance liking of a consumer at the time of purchase and throughout the working life of the computer. It would also be advantageous if the device could be incorporated with a handle to allow easier movement of the computer.

SUMMARY OF THE INVENTION

Accordingly, the present invention is directed to an accent panel with an integrated handle for a computer case that may be easily installed, removed and replaced. The accent panels of the present invention may be produced in a variety of colors mounting to the front bezel of a computer case. Through easy installation and removal, the color of a computer case may be modified on a regular basis to meet a consumer's desires.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made to a presently preferred embodiment of the invention, an example of which is illustrated in the accompanying drawings.

Figure 1:
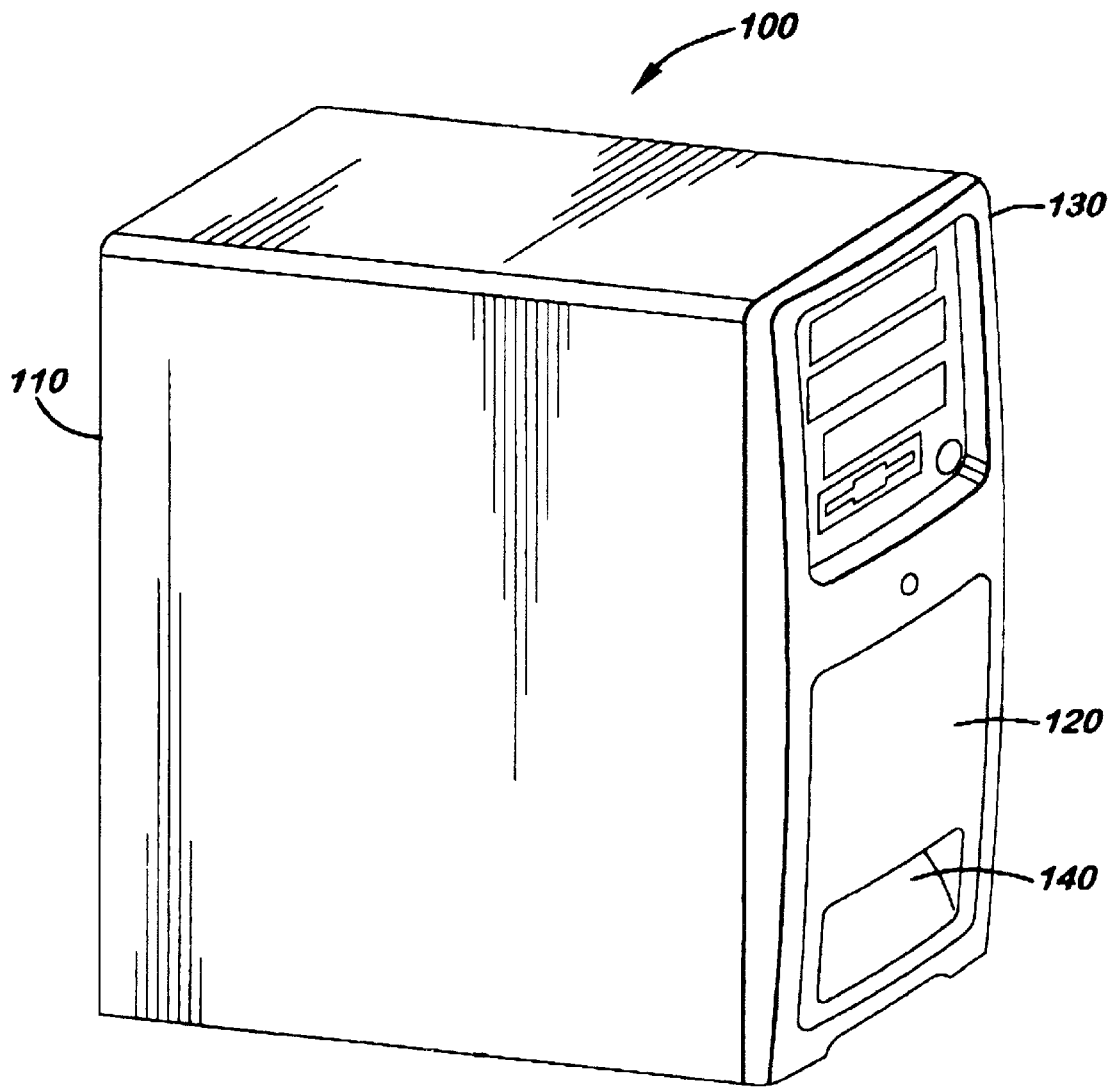
FIG. 1 depicts an exemplary embodiment of an accent panel of the present invention as connected to a bezel of a personal computer.

Referring now to FIG. 1, an exemplary embodiment 100 of a computer case 110 employing an accent panel 120 of the present invention is shown. The accent panel 120 may be removably connected to a front bezel 130. The bezel 130 may be mounted to the front side of a computer case 110.

Figure 2:
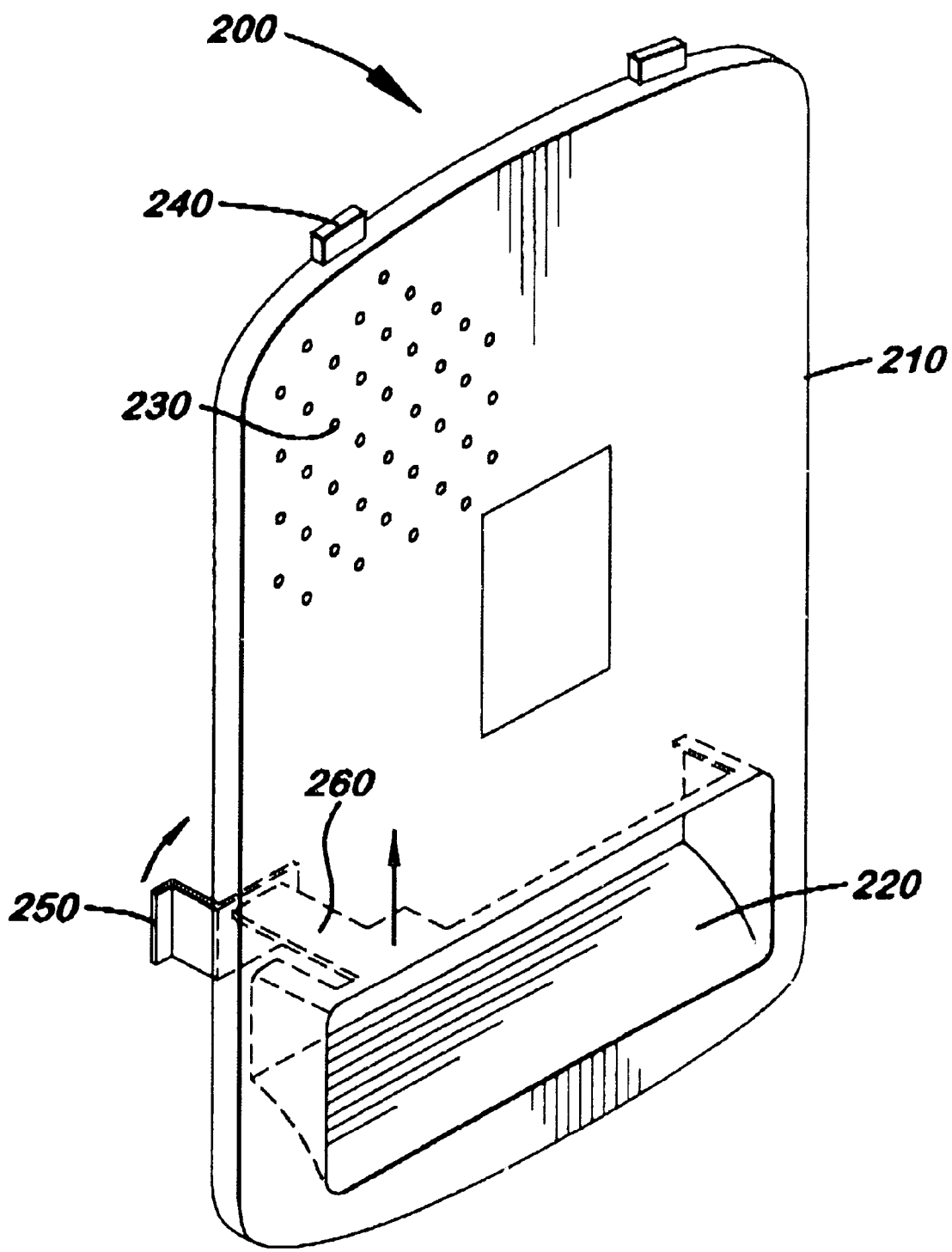
FIG. 2 is a cut-away view of an exemplary embodiment of an accent panel.

The accent panel 120 may be manufactured using cast metal, plastic, fiberglass and other suitable materials. In a presently preferred embodiment, the panel is manufactured from injected molded plastic. The accent panels may be manufactured in a variety of colors, designs, and shapes. The panel may also include graphical arts, for example, the logo of a consumer's favorite university or professional sports team. It should also be known that the exact design as shown in FIGS. 1–2 may be altered by one of ordinary skill in the art without departing from the scope and spirit of the present invention. In alternative embodiments, the accent panels 120 may include viewable molded designs and figures upon the front side of the accent panel.

In a presently preferred embodiment, the accent panel includes an aperture 140. The aperture 140 allows for ventilation for components contained within a computer case. Further, the aperture is of suitable size that a person's hand may fit within the aperture 140 of the panel 120 to aid in the movement of the computer case. A support member mounted to the bezel 130, shown in FIGS. 3–4, may be grasped by a person's hand for lifting and transporting the computer case.

Referring now to FIG. 2, a cut-away view of an exemplary embodiment 200 of an accent panel 210 is shown. A number of openings 230 may be placed in the accent panel 210 to aid in ventilating components within a computer case and for aiding visual appearance. In a preferred embodiment, the installation and removal of the accent panel may be accomplished via a pivot and detent method. Rails 240 may be fitted into preformed slots in the bezel and secured into placed via the springing tabs 250 that are capable of fitting within pre-formed slots in the bezel. It should be understood that other methods of toolless installation and removal of the accent panel may exist to one of the ordinary skill in the art without departing from the scope and spirit of the present invention.

In another embodiment, a knob 260 may be included with the accent panel located within the aperture 220 of the accent panel. The knob 260 may be spring-biased with the tabs 250 such that the accent panel may be released from the bezel when the knob 260 is depressed. Further, without releasing the knob 260, the accent panel may remain secured within the bezel.

Figure 3:
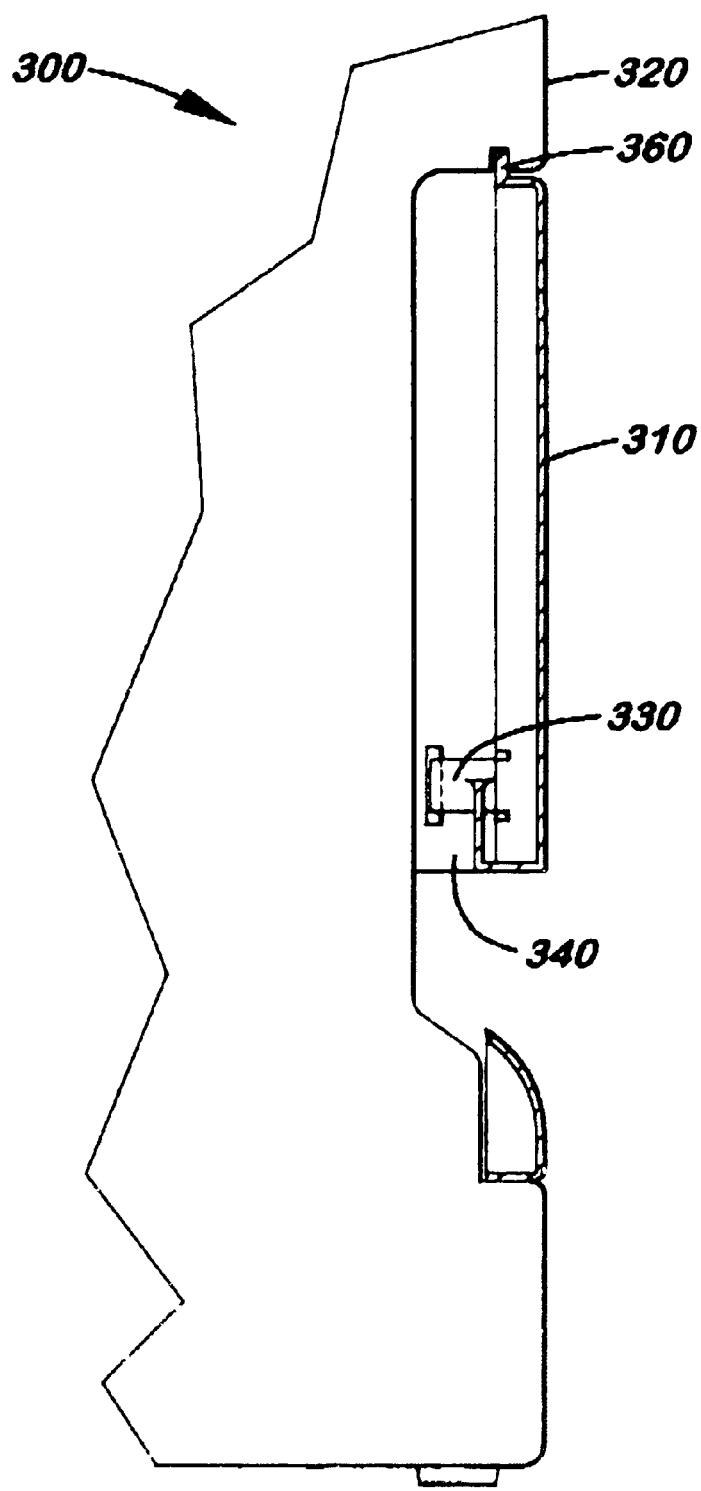
FIG. 3 is a side view of an exemplary embodiment of an accent panel connected to a bezel.

Referring now to FIG. 3, a side view of an exemplary embodiment 300 of an accent panel 310 connected to a bezel 320 is shown. Above the area of the aperture in the accent panel 310, a support member 340 may be mounted to the bezel 320. Thus when a person's hand reaches into the aperture of the accent panel 310, the person's hand may come into contact with a support member 340 that is mounted to the bezel 320. The support member 340 is capable of supporting the weight of the computer case and its components allowing easy movement of the computer case. FIG. 3 also depicts an exemplary embodiment of the securing hardware of the accent panel 310. Rails 340 may be fitted into preformed slots in the bezel 320 and secured into placed via the springing tabs 330 that are capable of fitting within preformed slots in the bezel 320.

Figure 4:
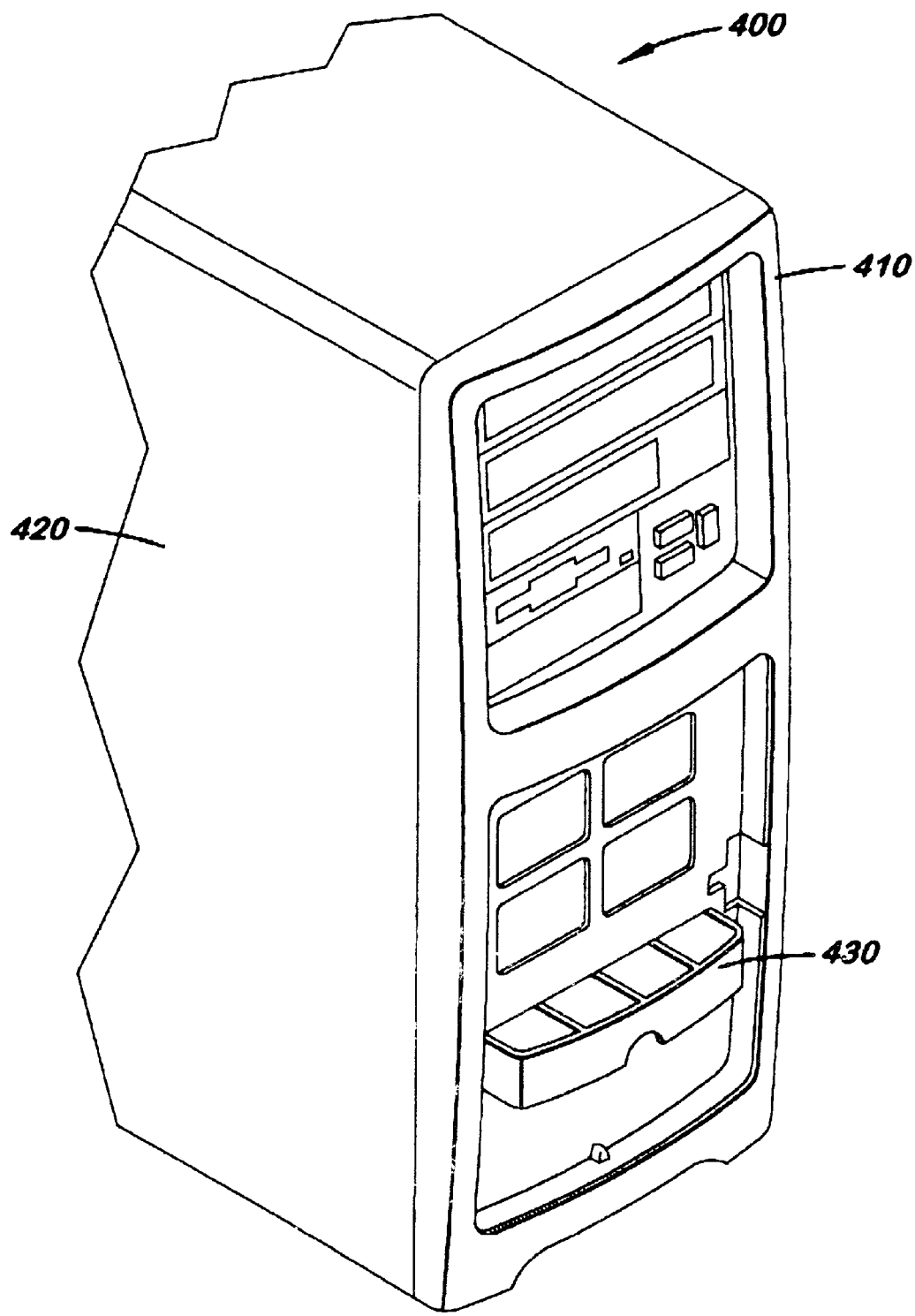
FIG. 4 depicts an exemplary embodiment of a bezel of the present invention including an exemplary support member.

Referring to FIG. 4, an exemplary embodiment 400 of a bezel 410 of the present invention is shown. A bezel 410 may be mounted to a front side of a computer case 420. An accent panel (not shown) may be removably connected to the bezel 410. An exemplary embodiment of a support member 430 is shown in FIG. 4. The support member 430 may be mounted to the bezel 410 and extend outward near the aperture of the accent panel. The support member 430 may be capable of supporting the weight of the computer case and its contents when a person's hand is placed within the support member 430. Further, beyond providing support the support member 430 allows for ventilation of the components within the computer case 420. In a preferred embodiment, four sections have been created in the support member 430 to allow space for four fingers of a person's hand to fit within each section to aid in transporting the computer case 420.

In an exemplary embodiment of the present invention, the support member 430 may project outwardly to the back side of the accent panel when the panel is secured within the bezel 410. In an alternative embodiment, the support member 420 may extend outwardly a distance less than the distance to the back side of the accent panel yet providing enough space for fingers of a person's hand to comfortably fit within the sections of the support member 430. Other embodiments of support members may be incorporated with the present invention by a person with ordinary skill in the art without departing from the scope and spirit of the present invention.

Although the invention has been described with a certain degree of particularity, it should be recognized that elements thereof may be altered by persons skilled in the art without departing from the spirit and scope of the invention. It is believed that the method and apparatus for the present invention and many of its attendant advantages will be understood by the foregoing description, and it will be apparent that various changes may be made in the form, construction, and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An apparatus for modifying the appearance of a computer, comprising:
    (a) a bezel mounted to a computer case; and
    (b) a panel removably connected to said bezel; wherein said panel comprises an aperture suitable for allowing finger access to a support member, said support member fixed to said bezel capable of supporting said computer case during transportation of said computer case, said panel being capable of toolless installation and removal, said panel being capable of altering a visual appearance of said computer case.

2. The apparatus as claimed in claim 1, wherein said panel includes a plurality of openings suitable for ventilating components within said computer case.

3. The apparatus as claimed in claim 1, wherein said panel is constructed from a group consisting of cast metal and plastic.

4. The apparatus as claimed in claim 3, wherein said plastic is injected molded plastic.

5. The apparatus as claimed in claim 1, wherein said panel is capable of installation via pivot and detent of said panel.

6. The apparatus as claimed in claim 1, further comprising a tab located within said aperture suitable for releasing and engaging said panel with said bezel.

7. The apparatus as claimed in claim 1, wherein said support member extends from said bezel to said panel.

8. An apparatus for modifying the appearance of a computer, comprising:
    (a) a bezel mounted to a computer case;
    (b) means for supporting said computer case fixed to said bezel, said supporting means being capable of supporting said computer case during transportation of said computer case; and
    (c) a panel removably connected to said bezel, wherein said supporting means is accessible within an aperture of said panel allowing finger access to said supporting means, said panel being capable of toolless installation and removal.

9. The apparatus as claimed in claim 8, wherein said panel includes a plurality of openings suitable for ventilating components within said computer case.

10. The apparatus as claimed in claim 8, wherein said panel is constructed from a group consisting of cast metal and plastic.

11. The apparatus as claimed in claim 10, wherein said plastic is injected molded plastic.

12. The apparatus as claimed in claim 8, wherein said panel is capable of installation via pivot and detent of said panel.

13. The apparatus as claimed in claim 8, further comprising a tab located within said aperture suitable for releasing and engaging said panel with said bezel.

14. An apparatus, comprising:
    (a) a case for storing components of a computer;
    (b) a bezel mounted to said case;
    (c) a support member fixed to said bezel capable of supporting said case during transportation of said case; and
    (d) a panel removably connected to said bezel, wherein said panel includes an aperture for allowing finger access to said support member, said panel being capable of toolless installation and removal.

15. The apparatus as claimed in claim 14, further comprising a tab located within said aperture suitable for releasing and engaging said panel with said bezel.

16. The apparatus as claimed in claim 14, wherein said support member extends from said bezel to said panel.

* * * * *